US009223706B2

(12) United States Patent
Penner (10) Patent No.: US 9,223,706 B2
(45) Date of Patent: Dec. 29, 2015

(54) SYSTEM, METHOD AND A NON-TRANSITORY COMPUTER READABLE MEDIUM FOR A PRE-FETCH OPERATION

(71) Applicant: Shlomi Penner, Shoham (IL)

(72) Inventor: Shlomi Penner, Shoham (IL)

(73) Assignee: INFINIDAT LTD., Herzliya (IL)

( * ) Notice: Subject to any disclaimer, the term of this patent is extended or adjusted under 35 U.S.C. 154(b) by 287 days.

(21) Appl. No.: 13/933,296

(22) Filed: Jul. 2, 2013

(65) Prior Publication Data
US 2015/0012712 A1 Jan. 8, 2015

(51) Int. Cl.
*G06F 12/00* (2006.01)
*G06F 12/08* (2006.01)

(52) U.S. Cl.
CPC .................. *G06F 12/0862* (2013.01)

(58) Field of Classification Search
None
See application file for complete search history.

(56) References Cited

U.S. PATENT DOCUMENTS

| 2005/0108450 A1* | 5/2005 | Sahara et al. .............. 710/52 |
| 2015/0012693 A1* | 1/2015 | Amit ................... G06F 3/064 711/104 |

\* cited by examiner

*Primary Examiner* — Baboucarr Faal
(74) *Attorney, Agent, or Firm* — Reches Patents (57) ABSTRACT

A method for pre-fetching information units, the method may include: (I) Receiving, by a storage system, write requests for writing information units to the storage system. Each write request includes a first identifier and a second identifier. The first identifier identifies a logical address. A combination of the first and second identifiers identifies an accessing entity that initiated the write request. (II) Receiving a read request for reading at least one information unit from the storage system, the read request is initiated by a certain accessing entity. (III) Determining whether to perform a pre-fetch of at least one additional information unit in response to at least one write request that was initiated by the certain accessing entity. If is determined to perform the pre-fetch then fetching the at least one additional information unit.

18 Claims, 6 Drawing Sheets

SYSTEM, METHOD AND A NON-TRANSITORY COMPUTER READABLE MEDIUM FOR A PRE-FETCH OPERATION

BACKGROUND

A host computer can host a virtualized environment. This allows the host computer to support multiple guest operating systems (also known as 'virtual machines') and to execute a plurality of applications that interact with these multiple guest operating systems.

The virtualized environment may include a virtualization manager (also called a hypervisor or a virtual machine manager) that allows the multiple guest operating systems to share a single hardware platform (such as a processor) by translating requests for resources (CPU, memory, hard disks) to the underlying hardware platform.

The host computer can be connected to a storage system that provides disk storage resources.

Storage resources of the storage system are exported to host computers in terms of LUNs (logical unit number).

A LUN is indicative of a combination of an accessing entity (e.g., a host computer or an application running at the host computer) and a logical volume. A LUN identifies a logical volume in the storage system that is exported to a specific accessing entity over a storage area network (SAN). Generally, different host computers or different applications within the host computers that access the same logical volume are provided with different LUN values.

A LUN can be addressed by using a communication protocol such as but not limited to internet small computer system interface (iSCSI), small computer system interface (SCSI), Fibre Channel and the like.

The logical volume identified by the LUN, may be a part of a disk drive, an entire disk drive, several disk drives, several partitions within several disk drives, span across a disk array and the like. In any case, the logical volume is treated as if it is a single device.

From the storage system perspective, the LUN or the logical volume is the lowest level of granularity in terms of performance and quality of service (QOS).

In a host of a virtual environment, for a given logical volume, different LUN values are not allocated per each one of the multiple guest operating systems hosted by a single host computer or per each one of the plurality of applications running on top of these multiple guest operating systems. Instead, only one LUN is used by all applications hosted by the host computer that access the same logical volume. Accordingly, the write and read patterns of each guest operating system and of each application cannot be tracked and this prevents an execution of pre-fetching based upon read and write patterns.

Furthermore, the virtualization manager of the host may allocate to different guest operating systems and/or different applications non-continuous logical address spaces within a logical volume in a manner that is not exposed to the storage system and thus the storage system is not able to determine read and write patterns based solely on the order of logical addresses it receives. This is illustrated in FIG. 1.

Figure 1:
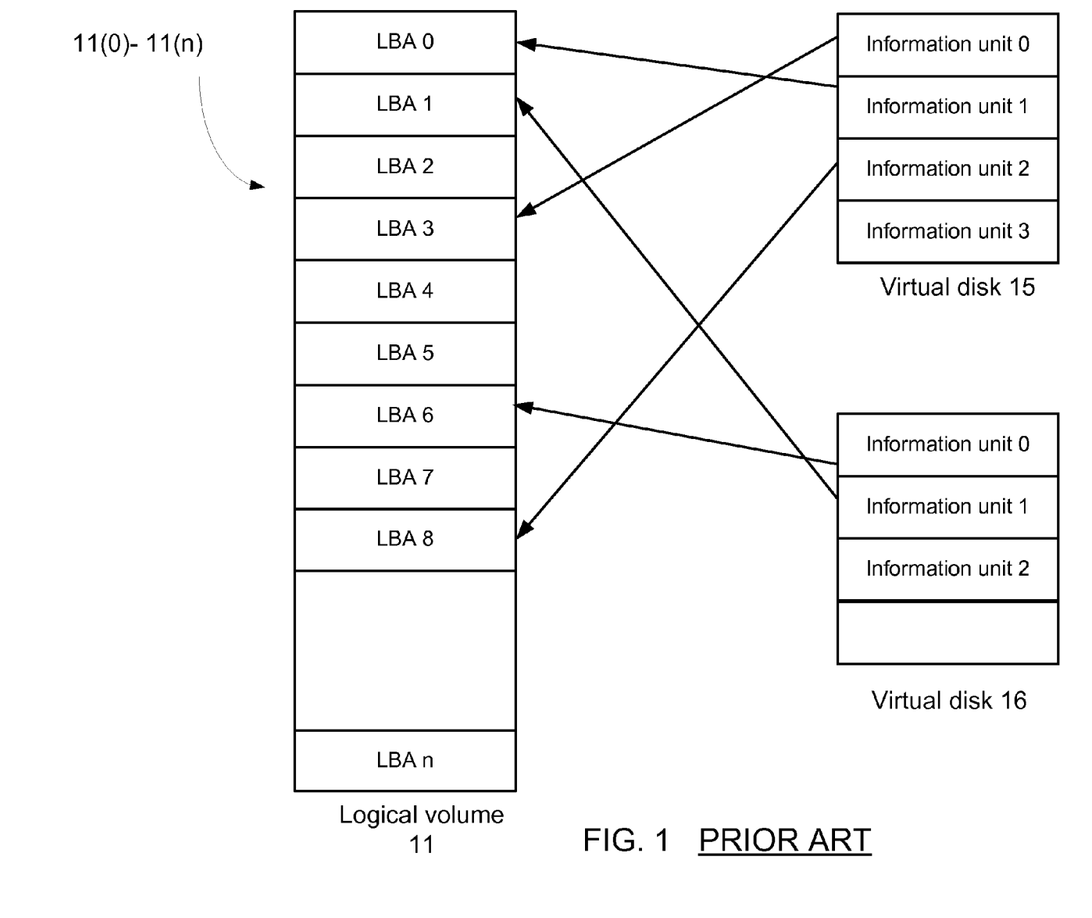
FIG. 1 illustrates a prior art mapping between a logical volume and multiple virtual disks.

FIG. 1 illustrates a prior art mapping between virtual disk addresses in a virtual disk presented to one application by the host computer and logical block addresses of a logical volume 11 managed by storage system and exported as a single LUN to a certain host computer. The certain host computer hosts a virtual environment. Logical volume 11 includes multiple successive logical block addresses (LBAs), numbered LBA0 to LBAn 11(0)-11(n).

The virtualization manager hosted by the host computer presents to each guest operating system a virtual disk, such as virtual disks 15 and 16, which are mapped into logical volume 11.

Virtual disk 15 includes m information units, which are presented as sequential to the guest operating system that uses virtual disk 15, but are not necessarily sequential within logical volume 11. For example, information unit 0 in virtual disk 15 is mapped to LBA3 of logical volume 11, information unit 1 is mapped to LBA0 and information unit 2 is mapped to LBA8.

FIG. 1 illustrates each information unit as being mapped into one logical block of logical volume 11, but this is not necessarily so and each information unit may be much bigger than a logical block (for example, a logical block may have a size of 512 bytes while the information unit may have a size of 1M bytes), so that each information unit can be mapped into multiple logical blocks, either contiguous or not.

A sequential read pattern from virtual disk 15 may include reading information unit 0, followed by information unit 1, followed by information unit 2. This sequential read pattern is translated by the virtualization manager to a non-sequential read pattern from logical unit 11: LBA 3, followed by LBA 0, followed by LBA8. In this case, a pre-fetch mechanism that would have been triggered upon detection of sequential read pattern would not be activated.

A pre-fetch mechanism is a mechanism for improving storage access latency, by detecting an access pattern and reading into the cache memory data that was not yet requested to be read, but it is assumed to have a great probability to be read, based on the detected access pattern. When the prefetched data is finally requested to be read it can be provisioned from the cache.

Migration is a process of moving a virtual machine from one host computer to another. Preferably, the migration is not noticeable by the end user, as the down-time is minimal and all the resources (e.g., the virtual disk) of the virtual machine are copied to its new location. The migration capability is being increasingly utilized in clustered virtual environments to provide efficient online system maintenance, reconfiguration and load balancing.

There is a growing need to provide a system, method and computer readable medium for allowing pre-fetch based upon read and write patterns of individual guest operating systems and/or applications.

SUMMARY

According to an embodiment of the invention a method may be provided for pre-fetching information units, the method may include receiving, by a storage system, write requests for writing information units to the storage system; wherein the write requests are initiated by multiple accessing entities; wherein each write request comprises a first identifier and a second identifier; wherein the first identifier identifies a logical address within a logical address space supported by the storage system and wherein a combination of the first and second identifiers identifies an accessing entity that initiated the write request; receiving a read request for reading at least one information unit from the storage system, the read request is initiated by a certain accessing entity of the multiple accessing entities; determining whether to perform a pre-fetch of at least one additional information unit in response to at least one write request that was initiated by the certain accessing entity; and if is determined to perform the pre-fetch then fetching the at least one additional information unit.

The accessing entities may reside in a virtual environment hosted by the host computer.

The write requests may be initiated by multiple accessing entities of a group of host computers; wherein each host computer of the group of host computers hosts a virtual environment; wherein each first identifier of each write request further identifies a host computer of the group that hosts an accessing entity that initiated the write request.

The at least one write request that was initiated by the certain accessing entity forms a write request pattern initiated by the certain accessing entity. The determining of whether to perform the pre-fetch may include comparing between (a) the write request pattern initiated by the certain accessing entity and (b) a read request pattern that may include (i) the read request initiated by the certain accessing entity and (ii) at least zero additional read requests initiated by the certain accessing entity.

The determining may include estimating whether the read request initiated by the certain accessing entity is a part of a sequential read request pattern.

The multiple accessing entities may include multiple guest operating systems.

The multiple accessing entities may include a plurality of applications.

The second identifier is included in a small computer system interface (SCSI) compliant command.

The method may include assigning, by the storage system, different values of the second identifier to different accessing entities of the multiple accessing entities.

The method may include receiving, by the storage system, a mapping between different values of the second identifier and different accessing entities of the multiple accessing entities.

The storage system may include a cache memory and a group of disk drives; and wherein the pre-fetching may include fetching the at least one additional information unit from at least one disk drive of the group to the cache memory.

According to an embodiment of the invention a non-transitory computer readable medium may be provided that may store instructions for receiving write requests for writing information units to a storage system; wherein the write requests are initiated by multiple accessing entities; wherein each write request comprises a first identifier and a second identifier; wherein the first identifier identifies a logical address within a logical address space supported by the storage system and wherein a combination of the first and second identifiers identifies an accessing entity that initiated the write request; receiving a read request for reading at least one information unit from the storage system, the read request is initiated by a certain accessing entity of the multiple accessing entities; determining whether to perform a pre-fetch of at least one additional information unit in response to at least one write request that was initiated by the certain accessing entity; and if is determined to perform the pre-fetch then fetching the at least one additional information unit. These instructions when executed by the computer may cause the computer to execute any stages of any method mentioned in the specification.

The accessing entities may reside in a virtual environment hosted by the host computer.

The write requests are initiated by multiple accessing entities of a group of host computers; wherein each host computer of the group of host computers hosts a virtual environment; wherein each first identifier of each write request further identifies a host computer of the group that hosts an accessing entity that initiated the write request.

The at least one write request that was initiated by the certain accessing entity forms a write request pattern initiated by the certain accessing entity and wherein the non-transitory computer readable medium may store instructions for determining of whether to perform the pre-fetch by comparing between (a) the write request pattern initiated by the certain accessing entity and (b) a read request pattern that comprises (i) the read request initiated by the certain accessing entity and (ii) at least zero additional read requests initiated by the certain accessing entity.

The non-transitory computer readable medium may store instructions for estimating whether the read request initiated by the certain accessing entity is a part of a sequential read request pattern.

The non-transitory computer readable medium may store instructions for assigning different values of the second identifier to different accessing entities of the multiple accessing entities.

The non-transitory computer readable medium may store instructions for receiving, by the storage system, a mapping between different values of the second identifier and different accessing entities of the multiple accessing entities.

The non-transitory computer readable medium may store instructions for fetching the at least one additional information unit from at least one disk drive of a storage system of the group to a cache memory of the storage system.

According to an embodiment of the invention there may be provided a storage system that may include: a storage system controller that is arranged to receive write requests for writing information units to a storage system; wherein the write requests are initiated by multiple accessing entities of a host computer; wherein each write request comprises a first identifier and a second identifier; wherein the first identifier identifies a logical address within a logical address space supported by the storage system and wherein a combination of the first and second identifiers identifies an accessing entity that initiated the write request; receive a read request for reading at least one information unit from the storage system, the read request is initiated by a certain accessing entity of the multiple accessing entities; determine whether to perform a pre-fetch of at least one additional information unit in response to at least one write request that was initiated by the certain accessing entity; and if is determined to perform the pre-fetch then fetching the at least one additional information unit. The storage system controller may execute or control the execution of any of the stages of any method mentioned in the specification.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

In the following description indexes N,K,Q, J, K1, N1, KJ and NJ are positive integers.

Figure 2:
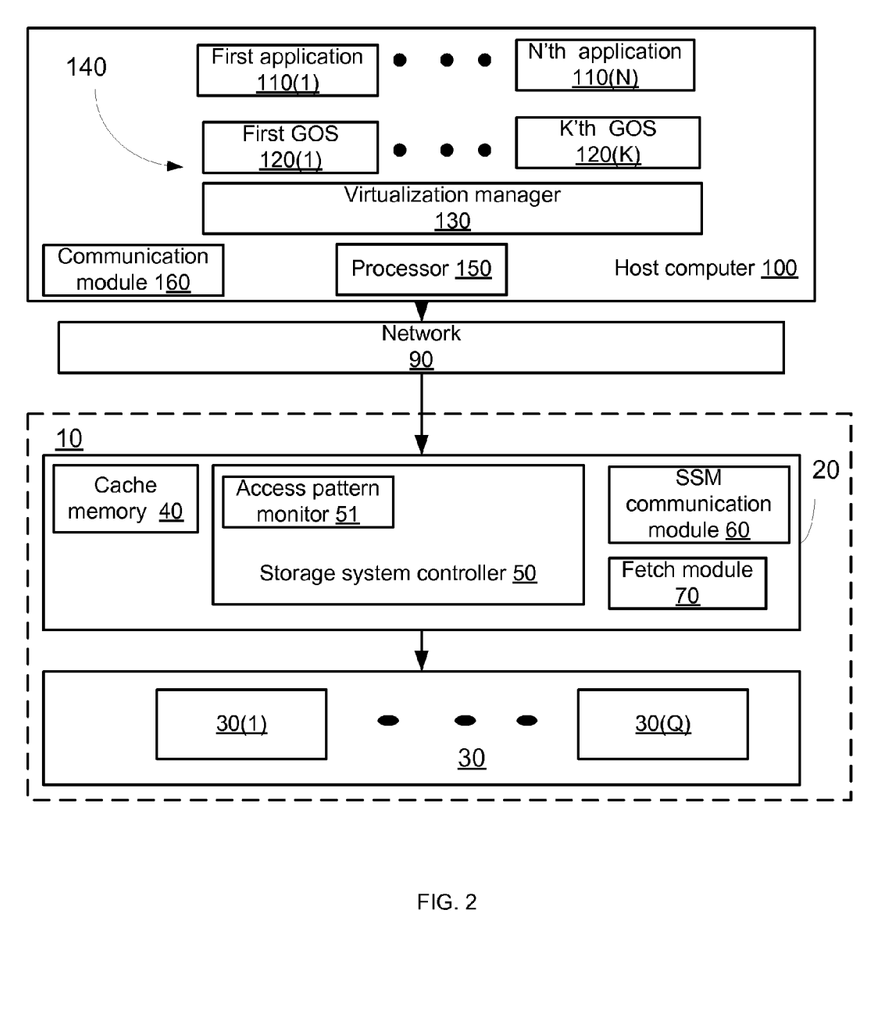
FIG. 2 illustrates a storage system, a host computer and a network according to an embodiment of the invention.

FIG. 2 illustrates a storage system 10, network 90 and host computer 100. The host computer 100 can be a host server, a combination of one or more computerized systems, and the like.

The storage system 10 is connected via network 90 to one or more host computers such as host computer 100.

The host computer 100 can host a virtual environment 140. The virtual environment 140 may include multiple (K) guest operating systems (GOSs) 120(1)-120(K), a plurality (N) of applications 110(1)-110(N) and a virtualization manager 130.

Host computer 100 includes a host communication module 160 and hardware platform that includes processor 150.

Each guest operating system (GOS) can support one or more applications. Thus, the number (K) of guest operating systems can equal to the number (N) of application or may differ from that number.

It is assumed that for a given logical volume different LUN values are not allocated per each GOS or per each application and that some of the GOS and/or applications share the same LUN value.

The virtualization manager 130 may allocate to different guest operating systems out of 120(1)-120(K) non-continuous logical block addresses within a logical volume in a manner that is not exposed to the storage system 10. Additionally or alternatively, the virtualization manager 130 may allocate to different applications out of 110(1)-110(N) non-continuous logical block addresses within a logical volume in a manner that is not exposed to the storage system 10.

It is assumed that an application or a GOS can initiate an access request (which may be a read request or a write request). The application or the GOS that initiated an access request is referred to as an accessing entity.

The accessing entity sends to the virtualization manager 130 a virtual disk access request with a virtual disk address and the virtualization manager 130 translates that virtual disk access request to a storage system access request that includes a logical address accessible for the accessing entity within the address space of the storage system and information about the identity of the accessing entity. Referring to the example set in FIG. 4—the access request 200 may include the logical address (also referred to as a first identifier 202) and the information about the identity of the accessing entity (also referred to as a second identifier 204). The access request 200 may include additional information such as the type (206) of access request—read or write, and the like.

Figure 4:
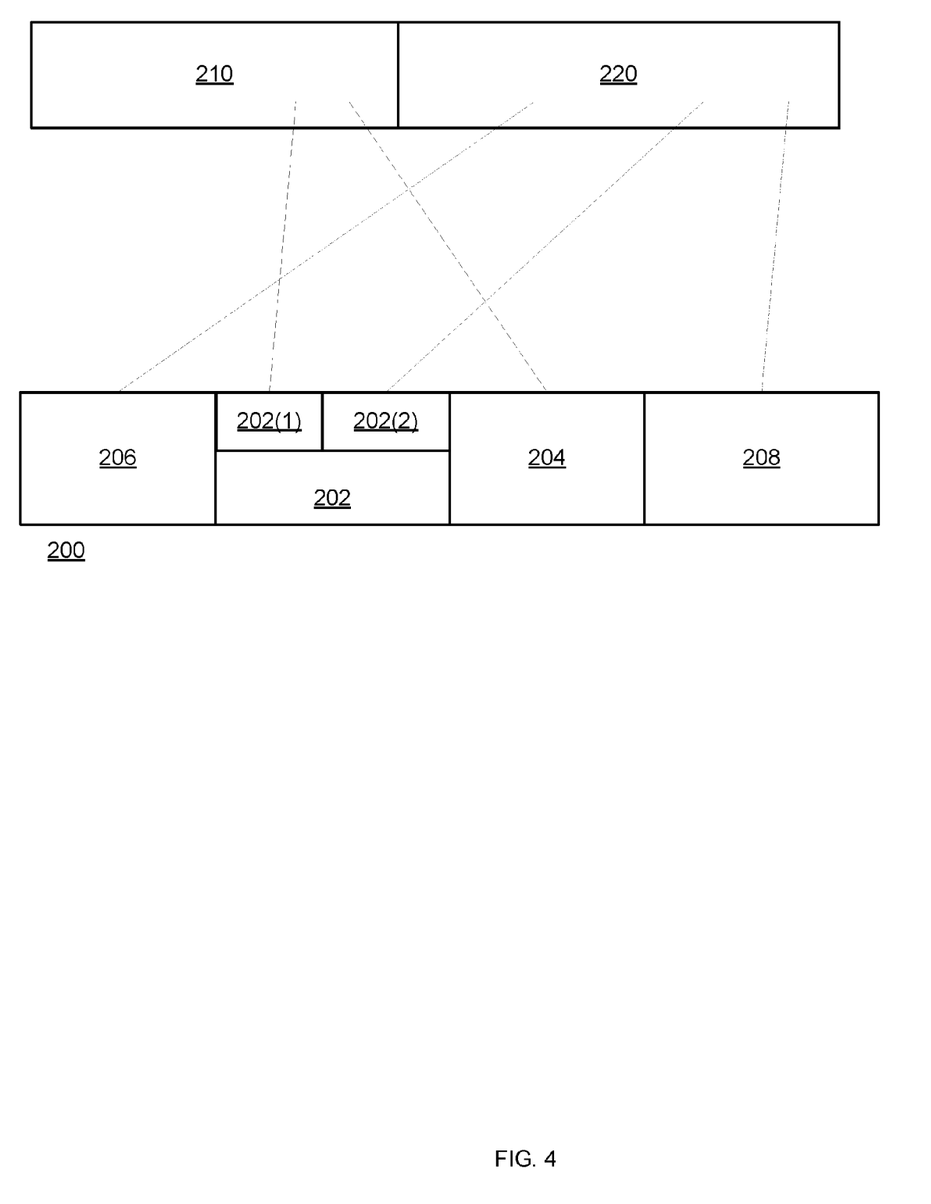
FIG. 4 illustrates an access request according to an embodiment of the invention.

The second identifier 204 may identify the accessing entity out of the accessing entities of host computer 100—it does not need to identify the host computer 100.

According to an embodiment of the invention, the second identifier 204 may have a unique value among all accessing entities in all the host computers connected to the storage system or among several host computers that compose one clustered virtual environment. In this embodiment, the second identifier 204 of a certain accessing entity may remain unchanged when the corresponding GOS is migrated to another host computer in the clustered virtual environment.

The logical address can include a logical volume identifier such as LUN 202(1) that is assigned by the storage system to the host computer 100 for accessing the logical volume and is indicative of the logical volume to be accessed and can optionally be further indicative of the host computer. The logical address can further include an offset 202(2) (for example LBA (Logical Block Address) within that logical volume. The access request may also include a length 208 of the information unit to be read or written (depending upon the type of access request—read request or write request). Field 202(1) may alternatively include identifiers of other types of storage devices, such as a physical drive, a partition within a physical drive, an identifier of a logical volume (other than a LUN) that is not necessarily indicative of the host, etc.

According to an embodiment of the invention the first and second identifiers can be conveyed using a SCSI communication protocol—that mandates using a Command descriptor block (CDB). A CDB may have a fixed length of up to 16 bytes or a variable length of between 12 and 260 bytes. The first byte in each CDB is the operation code—(e.g., READ, WRITE). Every SCSI command has a slightly different CDB.

The CDB for read/write commands includes among other fields:
  A. Logical Block Address (LBA)—the offset from the beginning of volume.
  B. transfer length—amount of data to be read/written (e.g. number of blocks or bytes to be read/written starting from LBA)

According to an embodiment of the invention the LUN field is included in a header of a transport layer protocol, e.g., an iSCSI header or a Fibre Channel header, and spare bits of that LUN field (e.g., in the iSCSI header) or other reserved or not used bits in the transport layer header can be used to convey the second identifier. The second identifier can be referred to as an inter-host computer identifier as it identifies an accessing entity given a host computer. Alternatively, if the second identifier is unique among hosts it can be viewed as both being a inter-host and intra-host computer identifier. In FIG. 4 the iSCSI header 210 is illustrated as including LUN 202(1) and second identifier 204 while the CDB 220 includes the offset 202(2), the access length 208 and the type (opcode) 206 of the access command.

Referring back to FIG. 2—storage system 10 includes a control layer 20 and a disk drive layer 30. It is noted that the term "layer" is merely indicative of a possible functional separation between the disk drives 30(1)-30(Q) of the disk drive layer 30 and between the control and caching functions implemented by the entities of the control layer 20. This separation is optional.

The control layer 20 includes a storage system communication module 60, a fetch module 70, a cache memory 40, and a storage system controller 50 that includes an access pattern monitor 51.

Storage system communication module 60 can implement block-based access standards, such as Small Computer Systems Interface (SCSI) protocol encapsulated over FibreChannel or over TCP/IP/Ethernet (iSCSI). Alternatively or additionally, storage system communication module 60 can implement a file-based protocol (NAS). Storage system communication module 60 includes all the hardware and software required for enabling data communication with the host computers, including the proper protocols and standards mentioned above, as well as proper cabling and at least one connector (e.g.: a parallel SCSI, Serial Attached SCSI (SAS), optical fibre connector, Ethernet connector and the like).

Storage system communication module 60 is coupled to an equivalent interface (host communication module 160) in host computer 100, over network 90, which may be a local area network (LAN), a wide area network (WAN), a directly attached bus, or any other network topology. The network 90 includes all the wiring required to implement a proper communication protocol for carrying the commands included in the block-based access protocol or the file-based access protocol.

Host computer 100 is arranged to communicate with storage system 10 via network 90 for sending data access commands, such as: read data/metadata, write data, or queries related to data or to storage resources, and for receiving responses to these commands. SCSI commands may be used, as a non-limiting example, for implementing the data access commands communicated over network 90.

The fetch module 70 can perform fetch and pre-fetch operations of information units from the disk drive layer 30 to the cache memory 40 and is controlled by the storage system controller 50.

The access pattern monitor 51 is arranged to obtain information about access patterns of different accessing entities and may detect access patterns.

According to an embodiment of the invention the storage system controller 50 may be arranged to:
  A. Receive (from the storage system communication module 60) write requests for writing information units to a storage system. The write requests are initiated by multiple accessing entities of host computer 100—one initiating entity per write request. As illustrated in FIG. 4—each write request may include a first identifier and a second identifier. The first identifier identifies a logical address within a logical address space supported by the storage system. It may also identify the host computer 100—for example—if such a first identifier is a LUN. A combination of the first and second identifiers identifies the accessing entity. Thus—it is not necessary that the first or second identifiers alone identify both the logical volume, host computer 100 and the accessing entity. In certain embodiments, the first identifier only identifies a logical address within the storage system (e.g., a logical volume and a LBA within the logical volume) and the second identifier solely identifies the accessing entity.
  B. Monitor (by the access pattern monitor 51) write request patterns for each accessing entity. This may include maintaining a writes log per each accessing entity. The writes log may be maintained per each accessing entity and a logical volume. Upon a write request the storage system controller 50 may record, in association with the accessing entity identifier and the accessed logical volume, one or more characteristics of the write request, e.g.: start LBA and length of the write (the number of successive logical blocks from the specified LBA) and any other parameter required for identifying access pattern. The order of the write requests may also be preserved or recorded. Optionally, a timestamp indicative of the time of receiving each write request may be added to each entry for determining the order of write requests.
  C. Receive a read request for reading at least one information unit from the storage system. The read request is initiated by a certain accessing entity of the multiple accessing entities. The read request may also include the first and second identifiers.
  D. Determine whether to perform a pre-fetch of at least one additional information unit in response to at least one write request that was initiated by the certain accessing entity. This may include checking for a matching write request pattern related to the certain accessing entity according to the writes log of the accessing entity. As the virtual manager 130 (or any other converting, masking or re-mapping entity—including an entity that is not located in a virtual environment) may convert sequential accesses to virtual disk addresses to what may seem non-sequential accesses to the storage system—the storage system controller 50 and especially the access pattern monitor 51 may try to find a write request pattern related to the certain accessing entity that matches (partially matches if the patterns has not been completed) a read request pattern related to the certain accessing entity—and try to fetch (pre-fetch) one or more additional information units that are still "missing" in the read request pattern. This may include checking if the read LBAs matches a write request sequence related to the certain accessing entity recorded in the writes log. The write request sequence can be determined according to the order in the log or according to the timestamps added to LBAs. If a read request sequence matches (partially matches) a write requests sequence (both related to the certain accessing entity and optionally, to the same logical volume) then a pre-fetch may be performed according to the order of the recorded LBAs that corresponds to the certain accessing entity.

E. Instruct (if is determined to perform the pre-fetch) the fetch module to fetch the at least one additional information unit to cache memory 40. The pre-fetching of the at least one additional information unit (not currently requested by the accessing entity) to the cache memory 40 is expected to speed the provision of the at least one additional information unit to the certain accessing entity—if the certain accessing entity actually requests them.

It is noted that a mapping between values of the second identifier and the accessing entities can be defined by the storage system 10, and additionally or alternatively by the host computer 100—especially by the virtualization manager 130. It is assumed that a certain value of the second identifier is assigned to an accessing entity before the accessing entity sends a first write request. Alternatively—the assignment of a value of the second identifier to identify an accessing entity can be triggered by the first read or write request from that accessing entity. The mapping can encompass all the accessing entities hosted by host computer or only some of them.

The storage system 10 and/or the host computer 100 can determine which accessing entities can be assigned with a unique second identifier and thus be able to benefit from access pattern based pre-fetching. The determination can be affected, for example, from a priority assigned to accessing entities, from the frequency of access request generated by accessing entities (accessing entities that tend to generate more access requests can be prioritized), from instructions received from system administrators or third parties, from time sensitivity associated with the different accessing entities (for example—more time sensitive applications such as real time applications can be prioritized over less time sensitive applications), from previous pre-fetch success statistics, and the like. Some second identifier values can be interpreted as "not care"—they should not be used for identifying accessing entities—those who should not benefit from the access pattern based pre-fetch operations.

According to an embodiment of the host computer 100 and/or the storage system, an administrator can determine which logical volumes and/or which LUNs will be benefit from access pattern based pre-fetching. Accordingly, the storage system controller 50 may determine whether to expect to receive the second identifier, monitor after access patterns and determined whether to perform pre-fetch in response to the value of the LUN it receives.

Figure 3:
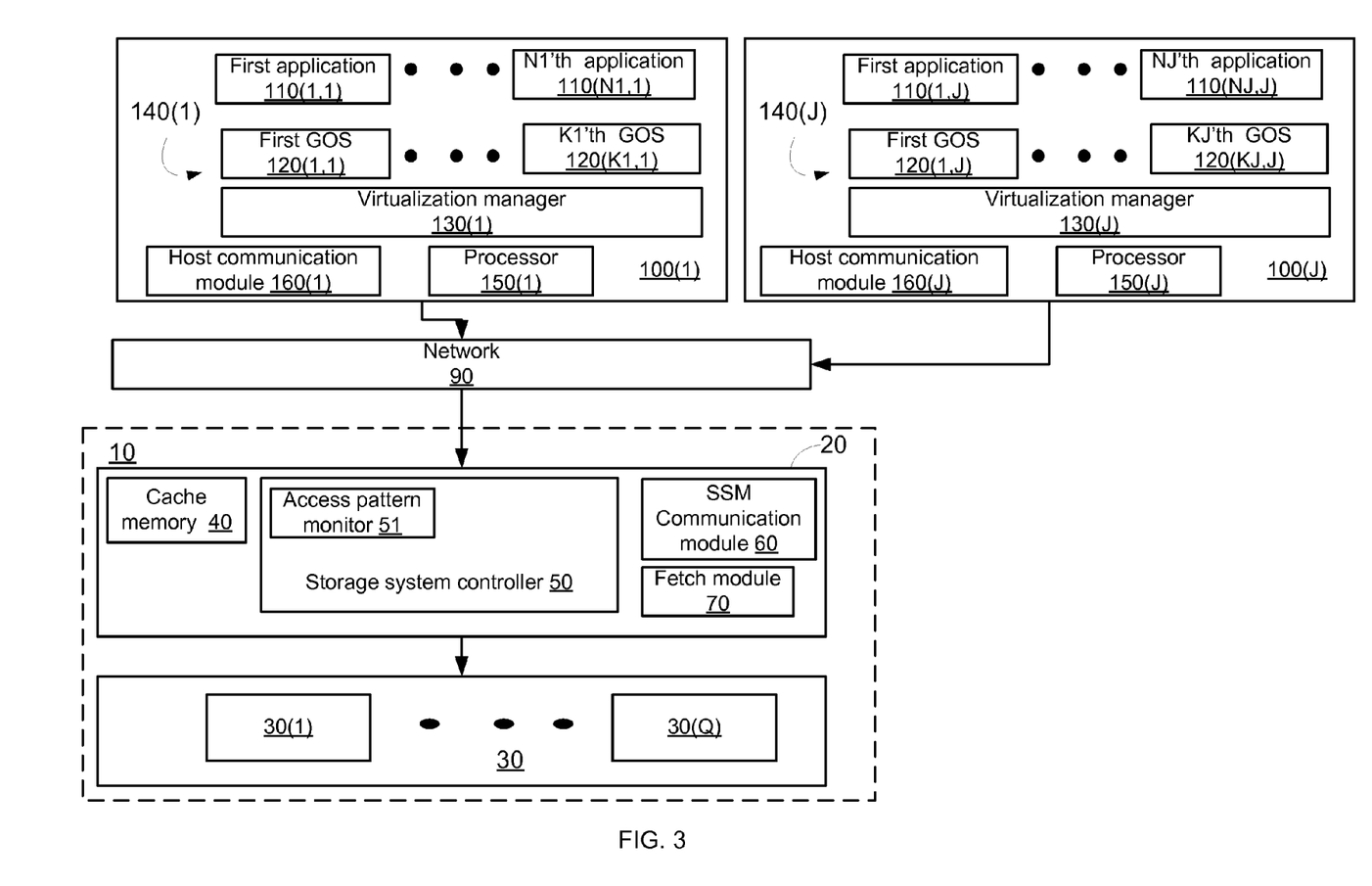
FIG. 3 illustrates a storage system, host computers and a network according to an embodiment of the invention.

FIG. 3 illustrates a storage system 10, network 90 and host computers 100(1)-100(J) according to an embodiment of the invention. Each one of host computers 100(1)-100(J) can be a host server, a combination of one or more computerized systems and the like.

The storage system 10 is connected via network 90 to host computers 100(1)-100(J). Each one of host computers 100(1)-100(J) can resemble host computer 100 of FIG. 2, such as host computers 100(1) and 100(j), or may be a regular host computer that does not host a virtual environment but can execute one or more applications. It is possible that several hosts (with or without virtual environment) may access the same logical volume, wherein each of these accessing entities (hosts or applications within the same or different hosts) form different access patterns. These different access patterns can be easily distinguished from each other by using the second identifiers that identifies each host or each application within the host.

In this example the first identifier (for example the LUN) can identify both the logical address and the host computer.

Host computer 100(1) hosts a virtual environment 140(1). The virtual environment 140(1) may include multiple (K1) guest operating systems (GOSs) 120(1,1)-120(K1,1), a plurality of applications 110(1,1)-110(N1,1) and a virtualization manager 130(1). Host computer 100(1) includes a host communication module 160(1) and hardware platform that includes processor 150(1).

Host computer 100(J) hosts a virtual environment 140(J). The virtual environment 140(J) may include multiple (K1) guest operating systems (GOSs) 120(1,J)-120(KJ,1), a plurality of applications 110(1,J)-110(NJ,J) and a virtualization manager 130(J). Host computer 100(J) includes a host communication module 160(J) and hardware platform that includes processor 150(J).

Some of the host computers, for example hosts 100(1) and 100(j) may be part of a clustered virtual environment and a system administrator is able to migrate a virtual machine (e.g. a GOS and all the applications running on top of it) from host 100(1) to host 100(j). In this case, the second identifiers of the migrated applications are not changed during a migration, so that the writes log of such an accessing entity being migrated can still be used for identifying read request sequences based on write request sequences, recorded in the write log of the accessing entity and the ability to perform pre-fetch is preserved for read requests that occur after the migration, based on write request patterns recorded before the migration.

Figure 5:
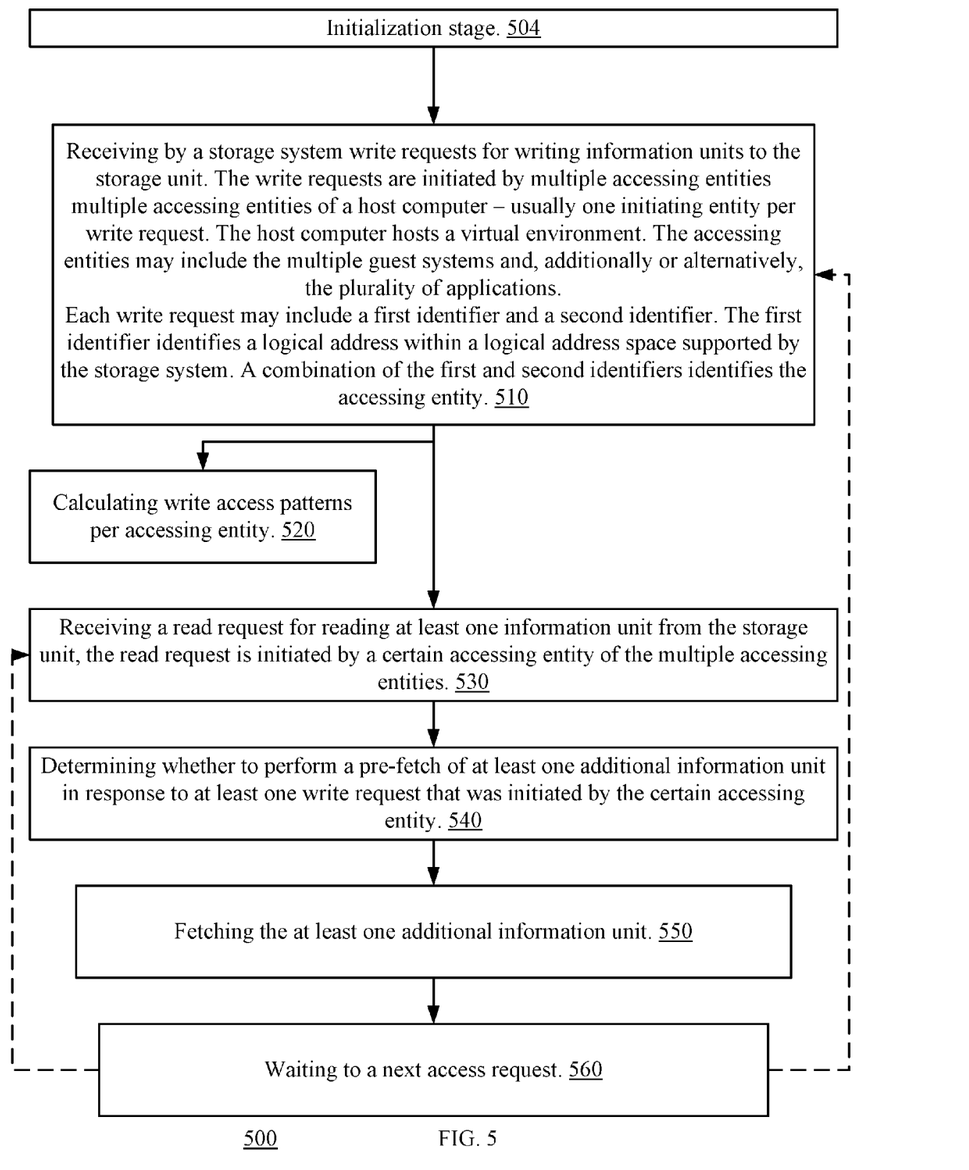
FIG. 5 illustrates a method according to an embodiment of the invention.

FIG. 5 illustrates method 500 according to an embodiment of the invention.

Method 500 may start by initialization stage 504.

Stage 504 may include assigning by a storage system different values of a second identifier with different accessing entities of the multiple accessing entities. Alternatively, stage 504 may include receiving by the storage system a mapping between different values of a second identifier and different accessing entities of the multiple accessing entities.

Initialization stage 504 may be followed by stage 510 of receiving by a storage system write requests for writing information units to the storage system. The write requests are initiated by multiple accessing entities of one or more host computers, one initiating entity per write request. The host computer(s) may host a virtual environment that includes multiple guest operating systems, a plurality of applications and a virtualization manager. The accessing entities may include the multiple guest systems and, additionally or alternatively, the plurality of applications.

Each write request may include a first identifier and a second identifier. The first identifier identifies a logical address within a logical address space supported by the storage system. A combination of the first and second identifiers identifies the accessing entity.

The first and second identifiers may be included in a header of a I/O access protocol utilized to carry the write request, for example, a command descriptor block (CDB) of a small computer system interface (SCSI) compliant command and or in a header of transport layer protocol that encapsulate the I/O access command, e.g. internet SCSI (iSCSI) or Fibre Channel.

The write requests may be initiated by multiple accessing entities of a group of host computers that may compose a clustered virtual environment (such as host computers 100

(1)-100(J) of FIG. 3), each host computer of the group hosts a virtual environment and each first identifier of each write request further identifies a host computer of the group that hosts a accessing entity that initiated the write request. The first identifier may be for example, a LUN (identifying a logical volume) concatenated with a host name, an IP-address or any other unique identifier of the host computer. The value of the LUN itself may be shared among all hosts in the clustered virtual environment or may have a different value in each host that accesses the logical volume.

Stage 510 may be followed by stage 520 of finding write access patterns per accessing entity.

Stage 520 may also be followed by stage 530 of receiving a read request for reading at least one information unit from the storage system, the read request is initiated by a certain accessing entity of the multiple accessing entities.

Stage 530 may also be followed by stage 540 of determining whether to perform a pre-fetch of at least one additional information unit in response to at least one write request that was initiated by the certain accessing entity. The pre-fetch can be executed if it is assumed (based upon the similarity between read and write access patterns—that certain information units are going to be read by the accessing entity).

If is determined to perform the pre-fetch then stage 540 is followed by stage 550 of fetching the at least one additional information unit. Else—stage 540 is followed by stage 560 of waiting to a next access request. Stage 560 may be followed by stage 510 or 530—depending upon the type of the access request.

The at least one write request that was initiated by the certain accessing entity may form a write request pattern of the certain accessing entity. Stage 540 may include comparing between the write request pattern of the certain accessing entity and a read request pattern that comprises the read request initiated by the certain accessing entity and by at least zero additional read requests initiated by certain accessing entity.

Stage 540 may include estimating whether the read request initiated by the certain accessing entity is a part of a sequential read request pattern.

Figure 6:
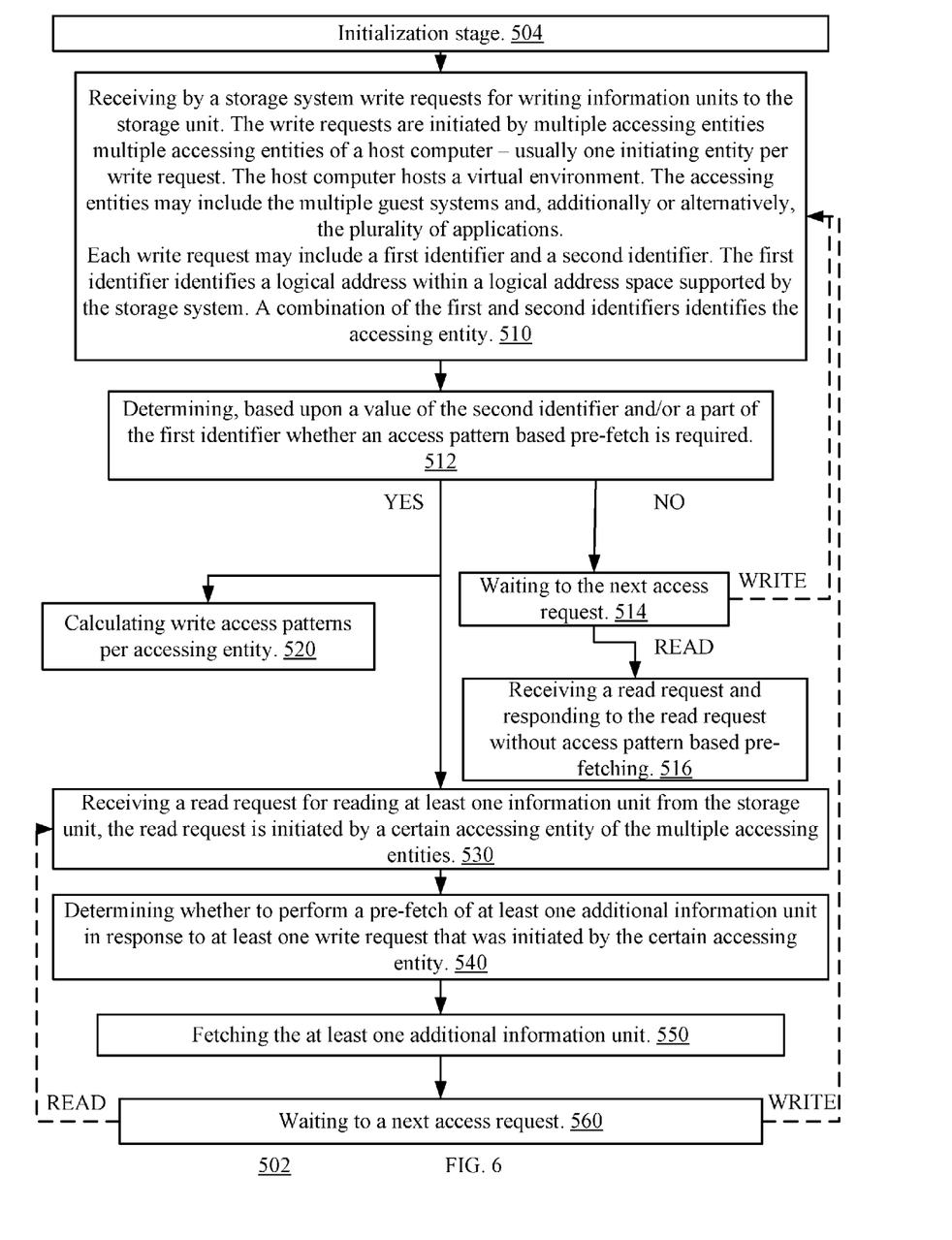
FIG. 6 illustrates a method according to an embodiment of the invention.

FIG. 6 illustrates method 502 according to an embodiment of the invention. Method 502 differs from method 500 of FIG. 5 by including stages 512, 514 and 516.

Stage 512 follows stage 510 and includes determining, based upon a value of the second identifier and/or a part of the first identifier whether an access pattern based pre-fetch is required.

If it is determined to perform an access pattern based pre-fetch then stage 512 is followed by stages 520 and 530. Else stage 512 is followed by stage 514 of waiting to the next access request. If the next access request is a write request then stage 514 is followed by stage 510 and if the next access request is a read request then stage 514 is followed by stage 516 of receiving a read request and responding to the read request without access pattern based pre-fetching.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for pre-fetching information units, the method comprises:
    receiving, by a storage system, write requests for writing information units to the storage system; wherein the write requests are initiated by multiple accessing entities;
        wherein each write request comprises a first identifier and a second identifier;
    wherein the first identifier identifies a logical address within a logical address space supported by the storage system and wherein a combination of the first and second identifiers identifies an accessing entity that initiated the write request;
    receiving a read request for reading at least one information unit from the storage system, the read request is initiated by a certain accessing entity of the multiple accessing entities;
    determining whether to perform a pre-fetch of at least one additional information unit in response to at least one write request that was initiated by the certain accessing entity, wherein the at least one write request forms a write request pattern initiated by the certain accessing entity; wherein the determining comprises comparing between (a) the write request pattern initiated by the certain accessing entity and (b) a read request pattern that comprises the read request initiated by the certain accessing entity; and
    if it is determined to perform the pre-fetch then fetching the at least one additional information unit.

2. The method according to claim 1, wherein the multiple accessing entities reside in a virtual environment hosted by the host computer.

3. The method according to claim 1, wherein the write requests are initiated by multiple accessing entities of a group of host computers; wherein each host computer of the group of host computers hosts a virtual environment; wherein each first identifier of each write request further identifies a host computer of the group that hosts an accessing entity that initiated the write request.

4. The method according to claim 1, wherein the determining comprises estimating whether the read request pattern at least partially matches the write request pattern initiated by the certain accessing entity.

5. The method according to claim 1, wherein the multiple accessing entities comprise multiple guest operating systems and wherein the logical address space identified by the first identifier is a logical volume.

6. The method according to claim 1, wherein the multiple accessing entities comprise a plurality of applications and wherein the logical address space identified by the first identifier is a logical volume.

7. The method according to claim 1, wherein the second identifier is included in a small computer system interface (SCSI) compliant command.

8. The method according to claim 1, comprising assigning, by the storage system, different values of the second identifier to different accessing entities of the multiple accessing entities.

9. The method according to claim 1, comprising receiving, by the storage system, a mapping between different values of the second identifier and different accessing entities of the multiple accessing entities.

10. The method according to claim 1, wherein the storage system comprises a cache memory and a group of disk drives; and wherein the pre-fetching comprises fetching the at least one additional information unit from at least one disk drive of the group to the cache memory.

11. A non-transitory computer readable medium that stores instructions for:
receiving write requests for writing information units to a storage system; wherein the write requests are initiated by multiple accessing entities; wherein each write request comprises a first identifier and a second identifier; wherein the first identifier identifies a logical address within a logical address space supported by the storage system and wherein a combination of the first and second identifiers identifies an accessing entity that initiated the write request;
receiving a read request for reading at least one information unit from the storage system, the read request is initiated by a certain accessing entity of the multiple accessing entities;
determining whether to perform a pre-fetch of at least one additional information unit in response to at least one write request that was initiated by the certain accessing entity, wherein the at least one write request forms a write request pattern initiated by the certain accessing entity; wherein the determining comprises comparing between (a) the write request pattern initiated by the certain accessing entity and (b) a read request pattern that comprises the read request initiated by the certain accessing entity; and
if is determined to perform the pre-fetch then fetching the at least one additional information unit.

12. The non-transitory computer readable medium according to claim 11 wherein the multiple accessing entities reside in a virtual environment hosted by the host computer.

13. The non-transitory computer readable medium according to claim 11 wherein the write requests are initiated by multiple accessing entities of a group of host computers; wherein each host computer of the group of host computers hosts a virtual environment; wherein each first identifier of each write request further identifies a host computer of the group that hosts an accessing entity that initiated the write request.

14. The non-transitory computer readable medium according to claim 11 that stores instructions for estimating whether the read request pattern at least partially matches the write request pattern initiated by the certain accessing entity.

15. The non-transitory computer readable medium according to claim 11 that stores instructions for assigning different values of the second identifier to different accessing entities of the multiple accessing entities.

16. The non-transitory computer readable medium according to claim 11 that stores instructions for receiving a mapping between different values of the second identifier and different accessing entities of the multiple accessing entities.

17. The non-transitory computer readable medium according to claim 11 that stores instructions for fetching the at least one additional information unit from at least one disk drive of a storage system of the group to a cache memory of the storage system.

18. A storage system that comprises: a storage system controller that is arranged to receive write requests for writing information units to a storage system; wherein the write requests are initiated by multiple accessing entities of a host computer; wherein each write request comprises a first identifier and a second identifier; wherein the first identifier identifies a logical address within a logical address space supported by the storage system and wherein a combination of the first and second identifiers identifies an accessing entity that initiated the write request; receive a read request for reading at least one information unit from the storage system, the read request is initiated by a certain accessing entity of the multiple accessing entities; determine whether to perform a pre-fetch of at least one additional information unit in response to at least one write request that was initiated by the certain accessing entity, wherein the at least one write request forms a write request pattern initiated by the certain accessing entity; wherein the storage system controller that is arranged to determine by comparing between (a) the write request pattern initiated by the certain accessing entity and (b) a read request pattern that comprises the read request initiated by the certain accessing entity; and if is determined to perform the pre-fetch then fetching the at least one additional information unit.

* * * * *